United States Patent

Howard et al.

(10) Patent No.: US 7,672,677 B2
(45) Date of Patent: Mar. 2, 2010

(54) METHOD AND SYSTEM TO TRANSFER AND TO DISPLAY LOCATION INFORMATION ABOUT AN OBJECT

(75) Inventors: William Brant Howard, Parker, CO (US); James David Main, II, Centennial, CO (US)

(73) Assignee: Compasscom Software Corporation, Centennial, CO (US)

( * ) Notice: Subject to any disclaimer, the term of this patent is extended or adjusted under 35 U.S.C. 154(b) by 730 days.

(21) Appl. No.: 10/999,089

(22) Filed: Nov. 29, 2004

(65) Prior Publication Data

US 2005/0159863 A1 Jul. 21, 2005

Related U.S. Application Data

(60) Provisional application No. 60/537,446, filed on Jan. 16, 2004.

(51) Int. Cl.
*H04W 24/00* (2009.01)
(52) U.S. Cl. .................. 455/456.1; 455/457; 455/569.2; 455/566; 455/575.6
(58) Field of Classification Search ............. 455/456.1, 455/457, 569.2, 566, 575.6
See application file for complete search history.

(56) References Cited

U.S. PATENT DOCUMENTS

| 5,794,174 | A | * | 8/1998 | Janky et al. ................. 701/207 |
| 6,995,708 | B2 | * | 2/2006 | Schmidt ................ 342/357.14 |
| 2003/0189922 | A1 | * | 10/2003 | Howe ......................... 370/352 |
| 2004/0014478 | A1 | * | 1/2004 | Hoffman et al. ......... 455/456.1 |
| 2006/0014528 | A9 | * | 1/2006 | Hsu et al. ................ 455/414.1 |

* cited by examiner

*Primary Examiner*—Joseph H Feild
*Assistant Examiner*—Huy D Nguyen
(74) *Attorney, Agent, or Firm*—Marsh Fischmann & Breyfogle LLP

(57) ABSTRACT

The present invention relates to a method and system to display information about an object. The system includes a mobile device to relay information about an object to a location content provider. The location content provider formats the information into a visual representation and transmits the information to one or more digital television provides. One or more of the digital television provides can forward the information to a recipient to display on the recipient's television.

30 Claims, 7 Drawing Sheets

METHOD AND SYSTEM TO TRANSFER AND TO DISPLAY LOCATION INFORMATION ABOUT AN OBJECT

CROSS REFERENCES TO RELATED APPLICATIONS

This application is related to and claims priority from Provisional Patent Application No. 60/537,446 filed on Jan. 16, 2004 titled "Method and System to Transfer and to Display Location Information About An Object", the contents of which is incorporated herein by reference.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The present invention relates to a method and system to display location information about an object on a display device. More particular, the invention relates to a mobile or fixed device that sends information to a location content provider that can relay the information to a digital television, information service provider, or other service provider that can send the information to a customer.

2. Description of the Related Art

The prior art relates to systems that track and report on objects or assets. These systems referred to as location content systems or automatic vehicle location systems require a great deal of equipment. To use a location content system, the user often must purchase and learn to use computers to track the assets, GIS systems to display the position of the assets, software to process the data received, and the communication component to receive data from the assets. These systems are expensive and difficult to use.

More recent systems have been sending analog visual representations of asset locations to cable television subscribers. For example, U.S. Pat. No. 5,744,825 to Reynolds describes a system to send information about an item to a cable television provider. The cable television provider creates a visual representation of the information. The visual representation is a frame overlay of a map and an icon of the item placed over the map and shows the item's position. This frame overlay is transmitted to the cable subscriber and displayed on their television. Unfortunately, this system requires the cable company to purchase and integrate a GIS system into their cable television broadcast system. In addition, the frame overlay method will not work in a digital television system. The prior art system also only provides this service to the specific cable television provider and can not incorporate other digital television service providers.

Another recent prior art system uses the telephone company to send the item information to a recipient. As described in U.S. Pat. No. 5,794,174, the tracking system sends the item information to the phone company, which relays the information to a cable set-top box. The cable set-top box interprets the information and displays it on the television. This system requires a telephone company to integrate a television broadcast system into the phone system. Essentially, a telephone company must produce the frames of video used in the display. Again, the telephone company, like the cable company, must operate an AVL system. Also, this prior art system only works with the specific telephone company.

There is a need to allow a display system to work with numerous service providers and numerous assets without burdening the service providers with using GIS systems. These and other problems are solved by the present invention.

BRIEF SUMMARY OF THE INVENTION

The present invention relates to a method and system to display information about an object. The system includes a mobile device to relay information about an object or asset to a location content provider. The location content provider formats the information and transmits the location information to one or more service providers. The service providers can then forward the information to a customer to display on the recipient's display device.

Figure 1:
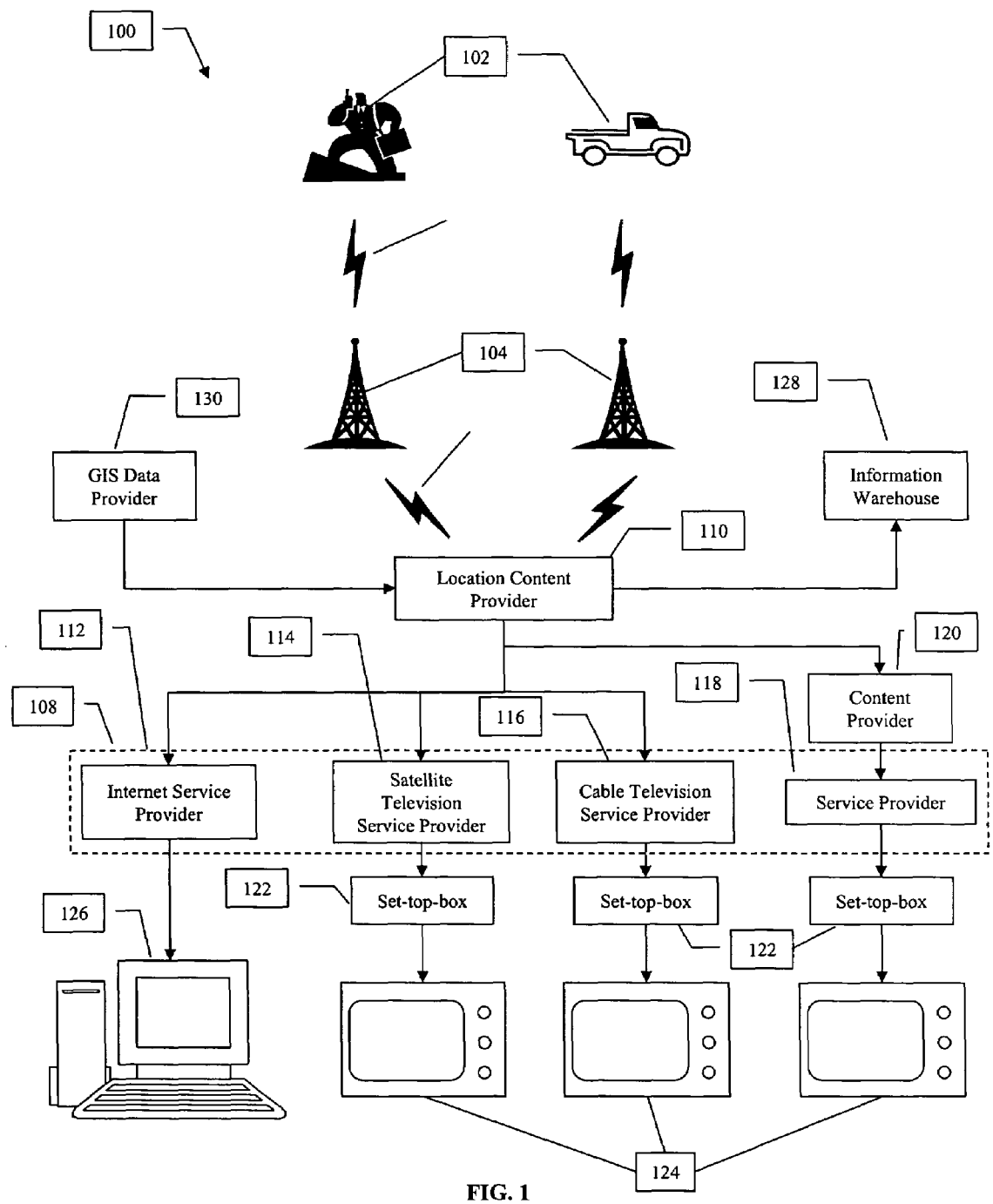
FIG. 1 shows an embodiment of a system to display information about an object in accordance with the present invention.

To clarify, each drawing includes reference numerals. These reference numerals follow a common nomenclature. The reference numeral will have three digits. The first digit represents the drawing number where the reference numeral was first used. For example, a reference numeral used first in drawing one will have a number like 1XX while a number first used in drawing five will have a number like 5XX. The second two numbers represent a specific item within a drawing. One item in FIG. 1 will be 101 while another item will be 102. Like reference numerals used in later drawing represent the same item. For example, reference numeral 102 in FIG. 3 is the same item as shown in FIG. 1.

DETAILED DESCRIPTION OF THE INVENTION

The present invention relates to GIS tracking systems. In particular, the invention relates to a system and method of providing location information to a customer of a service provider.

Location Content System

FIG. 1 shows an embodiment of the location content system 100. The system 100 includes one or more tracked items 102, a location content provider 110, one or more service providers 112, 114, 116, and 118, and one or more customers 124 and 126.

The tracked items, also referred to as assets or data 102, in the location content system 100, refer to many different things. Some items that may be considered assets 102 include, but are not limited to, people, vehicles, shipping containers, aircraft (airplanes, helicopters, etc.), watercraft (boats, jet skis, etc.), train cars, pets, or goods inventory. For instance, packages sent from warehouses to stores may be tracked to ensure proper delivery. Anything a customer 124 or 126 may want to track can be included as an asset 102 in the location content system 100. One skilled in the art will recognize other items that may be considered assets 102.

In one embodiment, the assets 102 may be people. For example, the location content system 100 may track the whereabouts of teenage children for their worried parents. Other organizations may track salesman or newspaper reporters. One skilled in the art will recognize other situations where an organization may track people as an asset 102.

In the embodiment shown, the assets 102 are vehicles. An example of a location content system 100 where the assets 102 are vehicles is a system used by city fire or police agencies. In these systems, the assets 102 are the fire trucks or police cars. These vehicles are tracked and directed throughout the city to respond to public safety emergencies. Although FIG. 1 shows the assets 102 as vehicles, the present invention is not limited to that embodiment, but the invention includes all items or things that may be tracked. Also, the assets 102 may refer to data that is incorporated into the information content provider system. This data may be from other fixed or mobile assets 102. For instance, the assets tracked may include fixed weather stations that can provide real-time or near real-time weather for mobile assets 102 at or near the weather station. In other embodiments, the assets 102 may include ATM or credit card machines that can record and provide financial activity, the time of the activity, and provide the location of the machine. This data can then be used to show both a physical and temporal representation of how and where a credit card was used over the course of some time. An owner of the card or police investigators can track down stolen cards or prevent identity theft and fraud using this type of information. The assets may also represent other serviced systems including, but not limited to, security systems, department of transportation cameras, or other similar systems.

To communicate between the asset 102 and the location content provider 110, the location content system 100 may employ one or more communication networks 104. The embodiment shown uses antennas to depict wireless networks 104. While a wireless network 104 is one network 104 that can be used in the location content system 100, the present invention is not limited to that embodiment. Rather, the location content system 100 can employ any type of communication network including the internet, land-line telephone systems, and other similar systems. With regards to a wireless network 104, the typical wireless network 104 can be a type of cellular network. A cellular network may include, but is not limited to, a PCS, CDMA, TDMA, FDMA, GSM, G3, or other cellular system 104.

In other embodiments, the wireless network 104 may include a system that utilizes an IEEE 802.11 standard. These 802.11 systems can often be found in buildings and can operate as wireless LANs. Other wireless systems like Bluetooth® or other wireless protocols may also be used by the present invention. Also, the assets and the tracking system may use newer low frequency systems, radio-frequency identification tags (RFID), or other emerging tracking systems.

Private networks may also be included in the location content system 100. A private network is a non-public system used exclusively by the organization employing the location content system 100. These private networks can include, but are not limited to, conventional or trunked radio systems, dedicated cellular systems or services, leased fiber optic systems, or satellite transmission systems. Thus, while this description uses public networks as an example, the invention is not limited to that embodiment. Rather, any network, including private networks, is included in this invention.

In some embodiments, the communications pathway may include an intermediate system (not shown). An asset 102 may transmit a signal to a wireless or other network which sends the data to an intermediate system. That intermediate system can relay the information to the location content provider 110. These intermediate systems can include, but are not limited to, other networks, WANs, LANs, RFID networks, or separate computers.

The location content system 100 includes a location content provider 110. The location content provider 110 can function as the central processor in the location content system 100. This server, system, or computer device can collect, route, store, and process the outgoing and incoming location data. The location content provider 110 is explained in more detail below.

Another part of the location information system 100 may include one or more service providers. The embodiment shown presents an internet service provider 112, a satellite television service provider 114, a cable television service provider 116, and a general service provider 118. These four service providers are provided only as examples. Other service providers 108 are contemplated and included in this invention. An internet service provider (ISP) 112 may be any company or entity that provides a customer, of that ISP 112, access to the internet or to some computer network. Typically, ISPs may include AOL, MSN, Earthlink or other similar companies. These companies may provide content to the customer beyond simple access to the internet. Thus, the ISP 112 may tailor what information the customer receives.

The satellite television provider 114 is a company or organization that transmits television signals to customers. Examples of satellite television providers 114 may include DirecTV, Dish Network, or like international services. These organizations provide television content to customers through a satellite transmission. In many cases, the satellite television signal is a digital signal. The satellite television providers 114 can customize the content of the transmitted signal for each customer by configuring the customer's receiving equipment.

The cable television provider 116 is a company or organization that transmits television signals to customers through a cable system. Examples of cable television providers 116 may include Comcast Cable Company, COX Cable Company, or other similar organizations. These organizations provide television content to customers through a transmission on a cable system. In many cases, the cable television signal is a digital signal. Like the satellite television providers 114, the cable companies can customize the content of the transmitted signal for each customer by configuring the customer's receiving equipment. Throughout the application, the service provider may be referred to as a digital television provider. However, the invention is not limited to that one embodiment. Rather, any service provider, as recognized by one skilled in the art, may be included in the location information system 100.

Customers 124 and 126 in the present invention may include several different entities. Customers 124 and 126 may include any person that partakes or purchases the services provided by the service providers. The customers 124 and 126 may include organizations that wish to track their employees or customers 124 and 126. In other embodiments, the customers 124 and 126 may include parents that wish to track the whereabouts of their children. Still other examples may include prisons tracking prisoners, hospices or relatives tracking the elderly, or the justice department tracking parolees. One skilled in the art will recognize the different organizations or people that may use the asset location information.

In one embodiment of the invention, the location information system 100 may include a content provider 120. The content provider 120 may receive the signal from the location content provider 110. As part of its delivery of content to the service provider 108, the content provider 120 may incorporate the location content into its signal. Content providers 120 are organizations or entities that provide the underlying programming to the service provider. For instance, the Weather Channel or HBO would be content providers 120 for the television service providers 114 and 116. One skilled in the art will recognize other entities that would be considered content providers 120.

In still another embodiment, the location information system 100 may include one or more information warehouses 128. These organizations are entities that purchase or procure information about assets or people and store, organize, or resell that information to marketers. As part of the location information system 100, the location content provider 110 may store then forward the location history of an asset 102 to the information warehouse 128. This location history can be a listing or log of locations visited by the asset 102, a listing or description of travel trends for the asset 102, a history of shopping trends, or other information about where the asset 102 goes or is going and when.

Another embodiment of the present invention may include one or more set-top boxes 122 located at the customer's location. The set-top box 122 is any device or program that can decode, organize, format, or present the location content to a display device 126 or 124. An example of the set-top-box 122 may be the signal decoder used in many cable and satellite television systems. The set-top box 122 may be incorporated with the display device 124 or housed in a separate unit. Personal Video Recorder (PVR), Digital Video Recorder (DVR), like systems used with TIVO, DVDs, or other systems, are included as set-top-boxes 122. An example of a PVR may be the Dish 721 digital video recorder offered by Dish Network. One skilled in the art will recognize other embodiments of the set-top box 122 that are incorporated into this invention.

The present invention may also include computers 126 or computer systems 126 serviced by the ISPs 112. These computers 126 may be the typical home or business computers 126. Computers 126 may be mainframes, servers, laptops, wireless devices serviced by ISPs (such as cell phones, Blackberries, or personal digital assistants) or desktop computers 126. The invention is not limited to a certain type of computer 126. Rather, the computer 126 is any device that can receive content or access the internet using the services provided by the ISP 112.

In some embodiments, the mobile device 205 may include one or more display devices 124 and 126. The display device 124 or 126 may be any type of electronic display. Examples may include, but are not limited to, CRTs, plasma screens, or LCDs. In one embodiment, the display device 124 or 126 can provide a GIS map. As part of the GIS information, the display device 124 or 126 can show streets, vehicles, locations, or other data. In some embodiments, the display device 124 or 126 may display satellite imagery or other photographs of locations of interest. The GIS map may be capable of zoom and pan functions. These GIS maps may be in numerous formats including, but not limited to, ESRI shape files, Microsoft files, or AutoDesk files. One skilled in the art will recognize other information that the display device 124 or 126 may show. Display devices 124 and 126 are well known in the art and will not be described further.

Mobile Device

Figure 2:
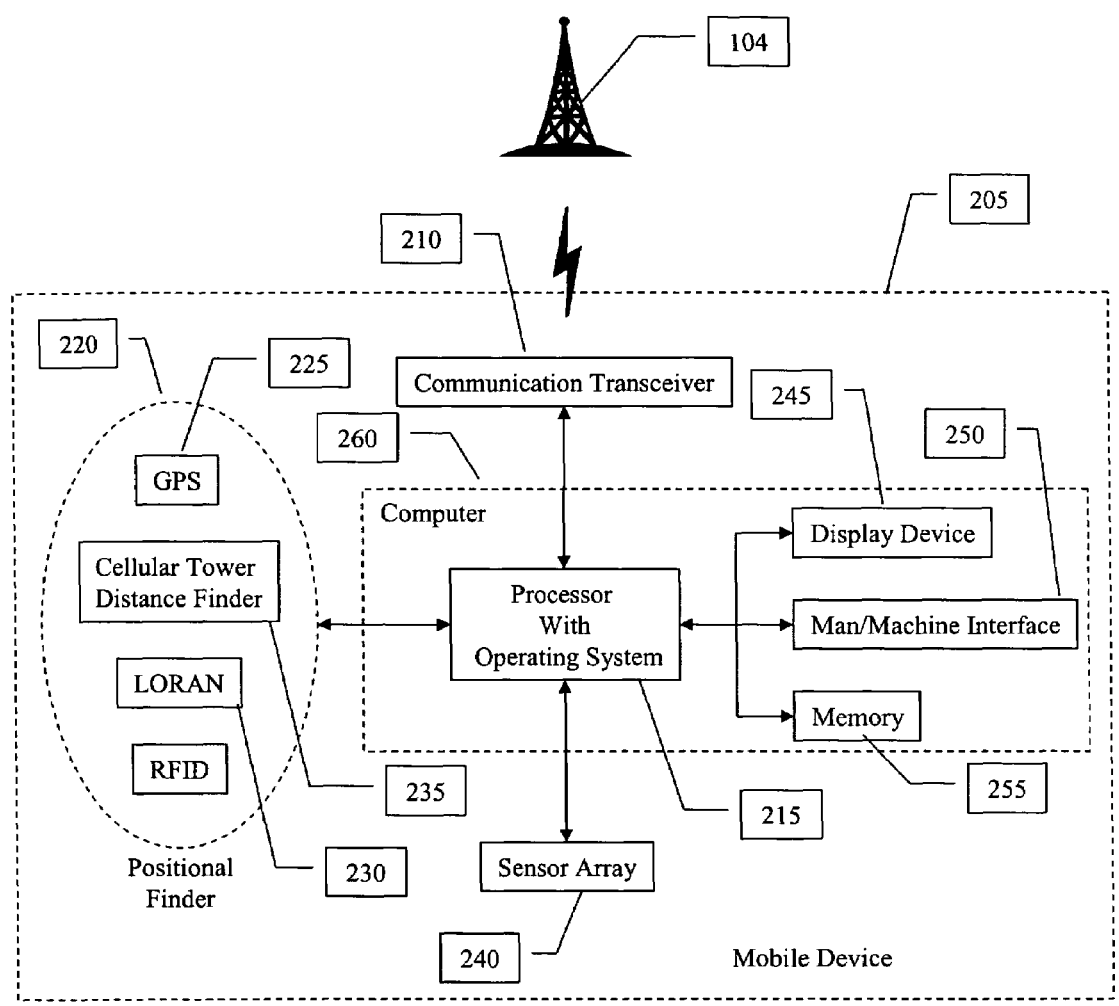
FIG. 2 shows one embodiment of a mobile device in accordance with the present invention.

Each asset 102 tracked by the location content system 100 includes a type of mobile device 205. FIG. 2 shows a block diagram of an embodiment of the mobile device 205. A mobile device 205 includes at least a communication transceiver 210 and a position finder 220. Other components in the mobile device 205 may include, but are not limited to, a processor 215, a sensor array 240, a memory 255, a man/machine interface 250, and a display device 245.

The communication transceiver 210 includes any device that can send or receive data from a communication network 104. Devices may include, but are not limited to, radio transmitters, radio handsets used on conventional or trunked radio networks, satellite transceivers, cellular telephone units, RFID units, or similar devices. A common communication transceiver 210 may be a cellular modem. These cellular devices may include any type of analog or digital cellular device. The cellular device may be capable of text messaging or other cellular functions. The present invention focuses on assets 102 using cellular devices, such as CDPD modems. Cellular modems and their equivalents are well known in the art and will not be explained further. While cellular devices are used to describe the invention, the invention is not limited to that one embodiment.

The mobile device 205 in a location content system 100 should also include a position finder 220. A position finder may be a LORAN 230 or local positioning system. These systems may use signals from local, land-based systems to determine the position of the asset 102. LORAN systems 230 and their equivalents are well known in the art and will not be explained further. Another position finder 220 may be a system that determines the distance from several cellular towers and can provide a position of the assets 102 using the determined distances (known as time distance of arrival). This type of system and its equivalents are represented by the cellular tower distance finder 235.

In an exemplary embodiment, the positional finder 220 would be a GPS receiver 225. The GPS receiver 225 can receive signals from one or more GPS satellites. A typical GPS receiver 225 decodes and analyzes the pseudo-noise signal from the GPS satellites. The GPS receiver 225 uses the signals to determine a coordinate-based position on the surface of the earth. GPS receivers 225 are well known in the art and will not be explained further. A mobile device 205 can use one or a combination of position finders 220. Recent cellular telephone devices incorporate a GPS receiver 225 and transmitter in the phone. These cellular phones lend themselves readily to use in the location information system 100.

Another exemplary embodiment would use RFID units. These small transmitters interact with a local receiving network. The receivers determine the position of the asset by the reception of the signal at one or more receiving terminals, similar to the time distance of arrival system explained previously. The position is calculated and sent to a transmitter. RFID is well known in the art and will not be explained further. RFID may be more suitable for tracking assets such as goods inventory.

Another component in the mobile device 205 may be a processor 215. The processor 215 may be a commercially-purchased microprocessor or microcontroller. As an example, the processor 215 may be from the Intel Pentium™ family, the Motorola PowerPC™ family, or similar type of processor. The processor 215 may also be modeled as a set of logic gates in a specially-designed ASIC or FPGA. For instance, the processor 215 could be modeled in an Altera APEX™ device. In other embodiments, the processor may be incorporated in a chipset. Processors 215 are well known in the art and will not be described further In some embodiments, a set of sensor 240 can be placed on the asset 102. The sensors 240 form the sensor array 240. Hereinafter, the sensor 240 and the sensor array 240 will be explained as interchangeable terms. However, it should be noted that one or more sensors 240 make the sensor array 240. The sensor 240 can measure different systems or characteristics of the asset 102. The sensor 240 may be piezoelectric devices, electromechanical devices, or other devices that can provide telemetry. In some embodiments, the sensors may be biometric sensors that can measure the physical function of a person or other living entity. For instance, an elderly person who is prone to heart attacks may wear a sensor to track the heart beat or EKG. This information can be sent to the location information provider.

The sensor telemetry can include discrete telemetry, analog telemetry, or digital telemetry. Discrete telemetry is usually a binary function. For instance, a police cars lights are either on or off. Discrete telemetry is normally represented by a single bit with a "1" representing the first state and a "0" representing the second state. Analog telemetry is a digital representation of an analog measurement. For instance, the body temperature of a person may include numerous data points, for instance, 98.7°, 99.2°, or 101.2°. The telemetry would use a plurality of bits to represent what the temperature is at that moment. Finally, digital telemetry is normally a value of some electronic component. For instance, a digital speedometer may be represented by digital telemetry.

In some embodiments, the mobile device 205 may include one or more of a display device 245, a man/machine interface 250, and a memory 255. The display device 245 may be any type of electronic display. Examples may include, but are not limited to, CRTs, plasma screens, or LCDs. In one embodiment, the display device 245 can provide a GIS map. As part of the GIS information, the display device 245 can show streets, vehicles, locations, or other data. In some embodiments, the display device 245 may display satellite imagery or other photographs of locations of interest. The GIS map may be capable of zoom and pan functions. These GIS maps may be in numerous formats including, but not limited to, ESRI shape files, Microsoft files, or AutoDesk files. One skilled in the art will recognize other information that the display device 245 may show. Display devices 245 are well known in the art and will not be described further.

A man/machine interface 250 is any device or system that allows a person to interact with the mobile device 205. An example of one man/machine interface 250 would be a keyboard or a personal digital assistant with a handwriting recognition device. The man/machine interface 250 may also be a touch-screen. As in this embodiment, the display device 245 and man/machine interface 250 may be integrated into a single device. Other embodiments may also use a microphone and speaker. A voice recognition system may employ the microphone to allow interaction between the user and the mobile device 205. One skilled in the art will recognize other devices that can function as the man/machine interface 250. Such man/machine interfaces 250 are well known in the art and will not be explained further.

Another component may be a memory 255. The memory 255 may provide a place to store the operating system executed by the processor. However, the processor may have internal memory 255 to store the operating system. In other embodiments, the memory 255 may store information for use by the asset 102. This information may include GIS data. For instance, the memory 255 may store a map and route information. The memory 255 may include, but is not limited to, any optical, electromagnetic, or electrical memory device. These devices may include, but are not limited to, RAM, ROM, hard drives, smart cards, optical discs, tapes, or discs. Memory devices 255 are well known in the art and will not be explained further.

In one embodiment, the processor, the display device 245, the man/machine interface 250, and the memory 255 are all included in a computer 260. This computer 260 may include, but is not limited to, a laptop computer, a personal digital assistant (like a PalmPilot), or cellular phone. The computer 260 can perform all the functions of the other devices. In a further embodiment, the computer 260 incorporates all the components of the mobile device 205. Essentially, the computer 260 becomes the mobile device 205. Computers 260 and other like devices are well known in the art and will not be explained further.

Location Content Provider

Figure 3A:
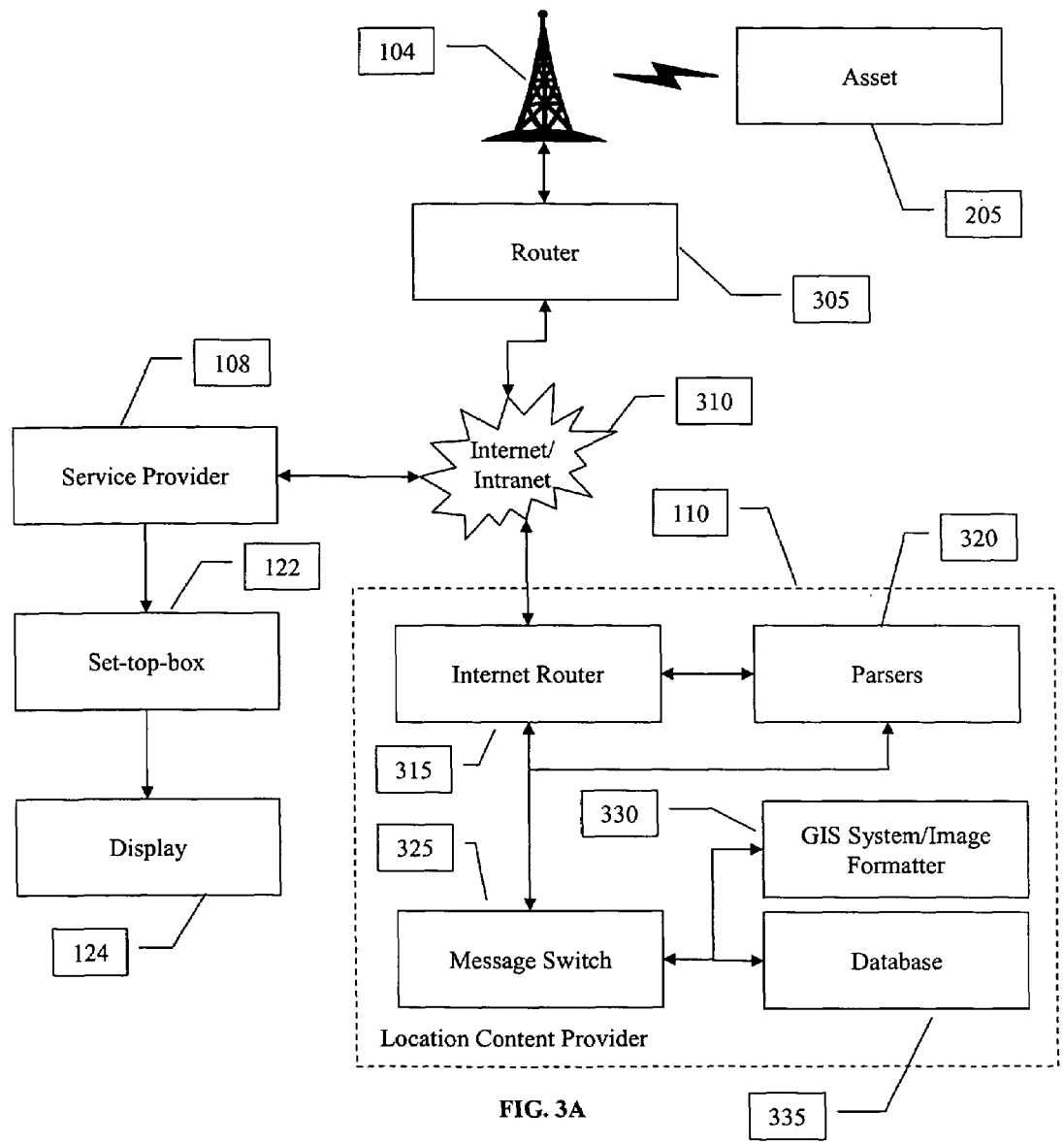
FIG. 3A through 3C several embodiments of location content providers and the systems that can create visual representations of location information and send them to a customer of a service provider in accordance with the present invention.
Figure 3B:
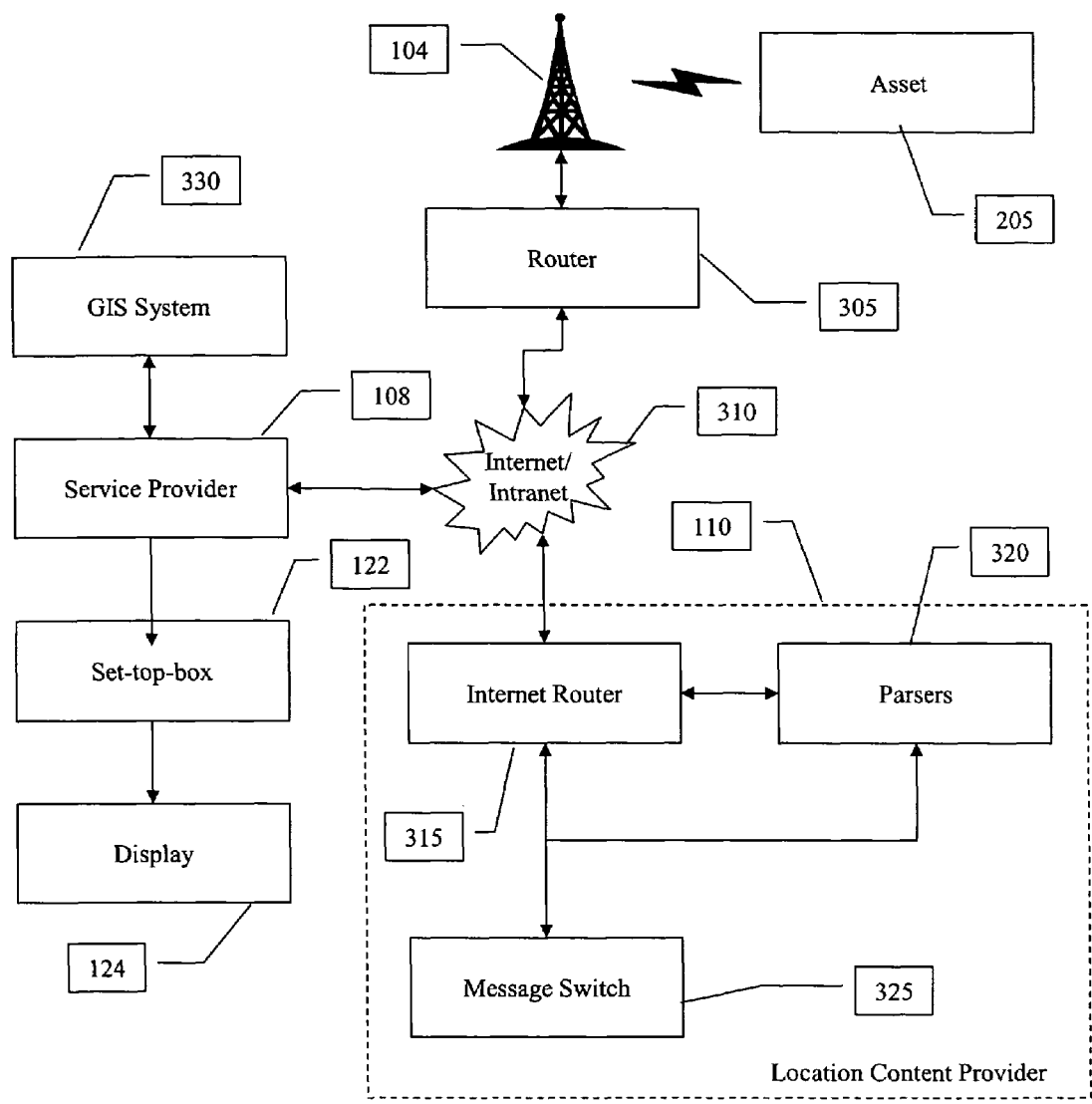
Figure 3C:
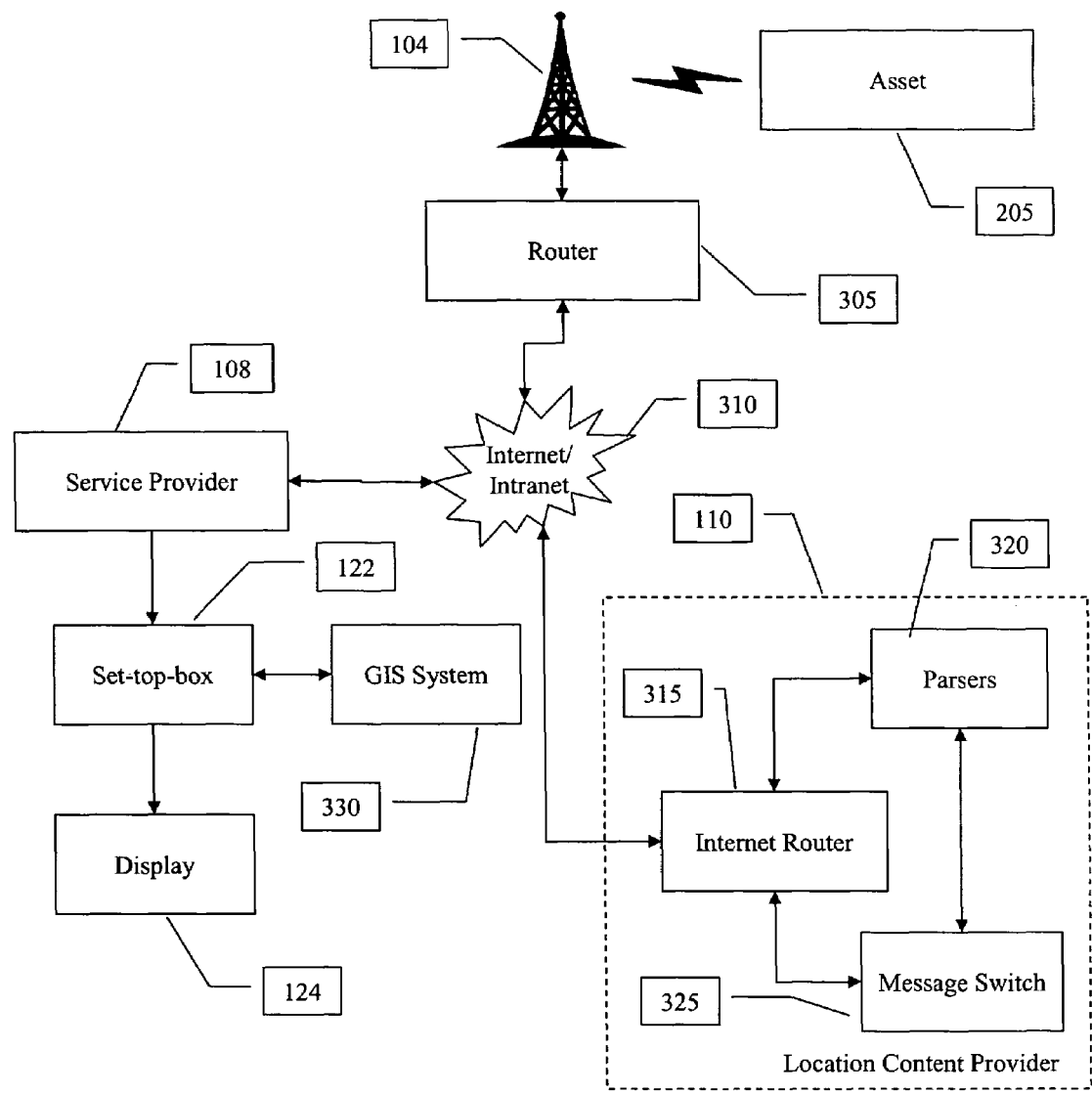

As explained earlier, the location information system 100 includes a location content provider 110. The location content provider 110 can function as the central device that processes and communicates with the mobile devices 205 and the service providers 108. In contrast to the prior art, the location content provider 110 may send location information to one or more service providers 108 and obviate the need to install or integrate unlike equipment in the service provider facilities. In addition, the location content provider 110 can change the location information into a format compatible with the service provider's existing systems. Many embodiments of the location content provider 110 exist. Some embodiments are shown in FIG. 3A through 3C. The location content provider 110 may include one or more parsers 320 and a message switch 325. Other components may also include, but are not limited to, an internet router 315, a GIS System/Image Formatter 330, and a database 335. As will be described below, the GIS System/Imager Formatter 330 may also be incorporated into the service provider facility or at the customer's facility.

The embodiments shown in FIG. 3A through 3C can be used with a wireless network 104. As explained earlier other communication connections may be made to the location content provider 110. The location content provider 110 includes those embodiments needed to use those other communication connections, such as the RFID networks. In the embodiment shown, the mobile device 205 sends signals to a wireless network 104. The signals may be sent onto the internet by a router 305. Those signals may then be received at the location content provider 110. Sending signals to the mobile device 205 can work in the reverse order. Sending to the service provider 108 may require by sending the signals back over the internet 310 and to the service provider 108. However, the location information content may be sent through other means including, but not limited to, satellite connection, landline telephone connection, or dedicated WAN. While FIG. 3A shows one specific embodiment, the invention is not limited to that one embodiment.

One component likely part of the location content provider 110 is the message switch 325. Essentially, a message switch 325 functions as a data router or a data relay. A message switch 325 can include any hardware device or software program that can effectively route the location messages. An example of a message switch 325 would be the Nortel Networks Alteon Application Switch or Compass FDE and Compass LDE offered by CompassCom, Inc. Message switches 325 are known in the art and will not be explained further.

Incoming data can have an association with a certain system. For instance, data from mobile device 205 that is to be sent to a customer 124 of a cable television service provider 116 has an association with the cable television system. The message switch 325 can assign an electronic address to the location data that relates to the customer 124 that will receive the message and sends that data to the cable television service provider 116. Similar associations are given to other assets 102 and there related service providers 108. Using these associations, the message switch 325 can receive data from a multitude of mobile devices 205 and send it to the appropriate recipients, regardless of what service provider 108 the customers 124 and 126 use. For instance, customers 124 of the cable television service provider 116 receive location data specifically addressed for the cable television provider 116, customers 124 of the satellite television service provider 114 receive location data specifically addressed for the satellite television provider 114, and customers 126 of the ISP 112 receives location data specifically addressed for the ISP 112. In essence, the message switch 325 can provide the data routing capability for a plurality of service provider systems. Thus, one message switch 325 simultaneously supports all possible service provider systems, which may include several satellite television providers plus several cable operators plus several ISPs. The prior art required the service provider to integrate the equipment to receive messages from the mobile devices 205. The present invention alleviates the need for the service provider 108 to receive the messages directly from the asset 102 because the message switch 325 can receive and route the messages to the service provider 108.

In one embodiment, the message switch 325 provides data to service providers in an application program interface (API). The API can mitigate problems the service providers 108 may experience in using the location data obtained from the various mobile devices 205. In other words, the message switch 325 puts the data in a format for easy use by the service provider systems. Connections with these outside service providers 108 may include any satellite, cable, internet, or intranet connections. In the embodiment shown, the message switch 325 sends data to the service providers via the internet. The message switch 325 sends the message to the internet router 315 that transmits the data to the service provider system 122. In other embodiments, the connection between the message switch 325 and the service provider system may include, but is not limited to, wireless LANs, WANs, satellite connections, other systems using TCP/IP protocol, or other systems using other protocols.

Another component in the location content provider 110 is a parser 320. The parser 320 functions as a communications interface between the asset 205, the service provider 108, the network 104, and the message switch 325. A parser 320 is a communication transceiver. Each parser 320 can connect and communicate to or with a different system or with systems using different protocols. For instance, one parser 320 may communicate with mobile devices 205 using a cellular system 104. This cellular system 104 may be using a CDPD protocol. Another parser 320 may communicate to mobile devices 205 using GSM cellular systems 104. Yet another parser 320 may communicate with mobile device 205 using a private radio network 104. Another parser 320 may communicate through a satellite link to a satellite television provider 114 using an MPEG protocol. A parser 320 could receive RFID signals directly or indirectly via a landline connection. The parsers 320 may use any type of communications system or protocol. There is one parser 320 for each type of system or each type of protocol.

The parsers 320 can receive all the incoming data in different formats. The parsers 320 can translate this data from the specific protocols into a standard format. Thus, the parser 320 is also a translation device. The parser 320 can be a hardware device or software for changing data in one format into another. While the embodiment shown only has one parser 320, there may be a plurality of parsers 320. One parser 320 can be created for each communication network 104 or each required communication protocol. In this way, the location content provider 110 may only need one message switch 325 for all the different types of networks 104 that may be used. Thus, adding new mobile devices 205 using new networks 104 or new service providers 108 providing different signals to their customers 124 and 126 only requires the addition of more parsers 320. Such a system provides maximum flexibility because a service provider 108 does not need to integrate a GIS System 330 or a communication system into their preexisting systems to send location information to their customers 124 and 126. Rather, all the location information may be received in a certain format and sent to the service provider 108 in a format easily used and incorporated in their existing systems.

Another component may be an internet router 315. An internet router 315 may be any transceiver that can send and receive messages over the internet. The internet router 315 can help the message switch 325 send information to the service providers. The internet router 315 may also receive data from a mobile device 205 and send it to the parser 320. Internet routers 315 are well known in the art and will not be explained further.

In the embodiment shown in FIG. 3A, the location content provider 110 includes a GIS System/Image Formatter 330. The GIS System 330 may include several components. In essence, the GIS System 330 is all hardware and software needed to translate the position data received from the mobile device 205 into a textual, visual, or other representation of the location. An example of a GIS System 330 may be the Mobile Client System offered by CompassCom, Inc. GIS Systems 330 are well known in the art and will not be explained further.

The GIS Image Formatter may be any hardware or software device that can translate the GIS image created by the GIS System 330 into a format usable in the service providers system. The GIS Image Formatter 330 differs from the parser 320, which can format the outgoing signal to easily integrate into the service providers system. The GIS Image provider modifies the GIS System 330 to be compatible with a CODEC or other system that displays the image at the customer's location. In essence, service providers 108 that do not normally transmit video or visual data may forego integrating image creation equipment because the GIS Image Formatter 330 can accomplish the required formatting. This embodiment aids service providers 108, such as telephone companies, that can transmit the GIS Image to a customer 124, but do not have image creation systems incorporated in the telephone system. MPEG encoders and similar systems are well known in the television industry and will not be explained further.

Another component may be a data base or a storage system for asset tracking data and GIS maps. The database 335 may be any type of storage device including, but not limited to, electromagnetic, magnetic, optical, or electrical. An example would be the StorageTek PowderHorn® 9310 System. Other examples may include RAID systems or a storage disc system like one from the Iomega Zip disc family. The database 335 may store data that would be processed or sent to the information warehouse 128.

In some embodiments, the location content provider 110 may be a single computer 126 or several connected computers 126. It is contemplated that one or more of the parser 320, internet router 315, message switch 325, database 335, or GIS Systems 330 may be incorporated into one or more combined devices. For instance, the location content provider 110 may include several servers connected as a network 104. This type of distributed computing may also use other components such as mainframes or workstations. In one embodiment, all the connected devices transfer data using TCP/IP or other protocols. Data goes through the message switch 325. At the message switch 325 the data can be sent to another location content provider 110. In another embodiment, two location content providers 110 concurrently receive the data. One of the location content providers 110 can function as a back-up.

Using IP addresses, the location content system 100 may have several separate systems running in parallel. For instance, the location content provider 110 may have a back-up system. The back-up system need not be collocated with the primary location content provider 110. Rather, the back-up system can be located in another building, another city, another state, or another country. Any data going to the primary location content provider 110 may be copied and retransmitted to the back-up station. The back-up station may have the same IP address or by dynamic IP address capable and receive duplicate messages from the transmitting devices. A back-up station may have duplicate systems or a different configuration from the primary location content provider 110. In other embodiments, the location content system may be a self-healing system. One skilled in the art will recognize that there are other architectures and other connections are possible for the location content system 100.

The location content system 100 may also include an internet connection 114. The internet connection simply means the data is transported over an internet, such as the World Wide Web. As shown in FIG. 1, not all communications may go over the internet 114. Rather, some of the communications pathways may be direct connections from the networks 104 to the location content provider 110. For instance, some of the networks 104 may be connected to the location content provider 110 by a dedicated T1 line. Other connections are possible. The internet 114 and these direct connections are well known in the art and will not be explained further.

Other embodiments of the location information system exist. In FIG. 3B, the GIS System 330 is integrated into the service provider's systems. This embodiment shows one possibility where one or more service providers 108 either already have a GIS System 330 or decide to integrate the GIS System 330 into their preexisting systems. The location content provider 110 still functions as the central receiving location for all the location data from the mobile devices 205. Once the location content provider 110 receives the data, the location content provider 110 can translate the location data and format it for use by the GIS System 330 at the service provider's location. Also, the location content provider 110 can send the data to numerous other service providers that do not have GIS Systems 330 or need the data in another format.

Another embodiment is shown in FIG. 3C. In this embodiment, the GIS System 330 is incorporated into the customer's display system. Developments in set-top-boxes for satellite and cable television may allow the incorporation of the GIS System 330 into the customer's location. Personal Video Recorder (PVR) systems, like those used with TIVO, include a storage medium. An example of a PVR may be the Dish 721 digital video recorder offered by Dish Network. Usually, the PVR system has a large hard drive. These systems may have upwards of 50 gigabytes of storage space. A full-scale GIS System 330 may only require 2 gigabytes of storage. Thus, a GIS System 330 can be stored on these PVR systems. In addition, a computer 126 may store the GIS System 330 on a hard drive or other storage medium. Some minor changes to the software or some minor hardware changes may accompany the addition of the GIS System 330 to the customer's systems. In any of the embodiments, the GIS system may be updated by the location content system by downloading new GIS information or software over the same connection used for the location content or by a separate dedicated connection for the updates.

Having the GIS System 330 at the customer's location allows that customer 124 or 126 to use functions, such as pan or zoom, without requiring repeated transmissions of a GIS image over the service provider's system. While a full-scale GIS System 330 may be stored on the customer's system, a smaller more user-friendly version may also be created and used. This user-friendly version could include functions commonly used by the service provider's customer 124 and 126 but a version that is not complicated to use. Any of the three embodiments and other contemplated embodiments using a GIS Systems 330 are incorporated in this invention.

Location Content Formatting

Figure 4:
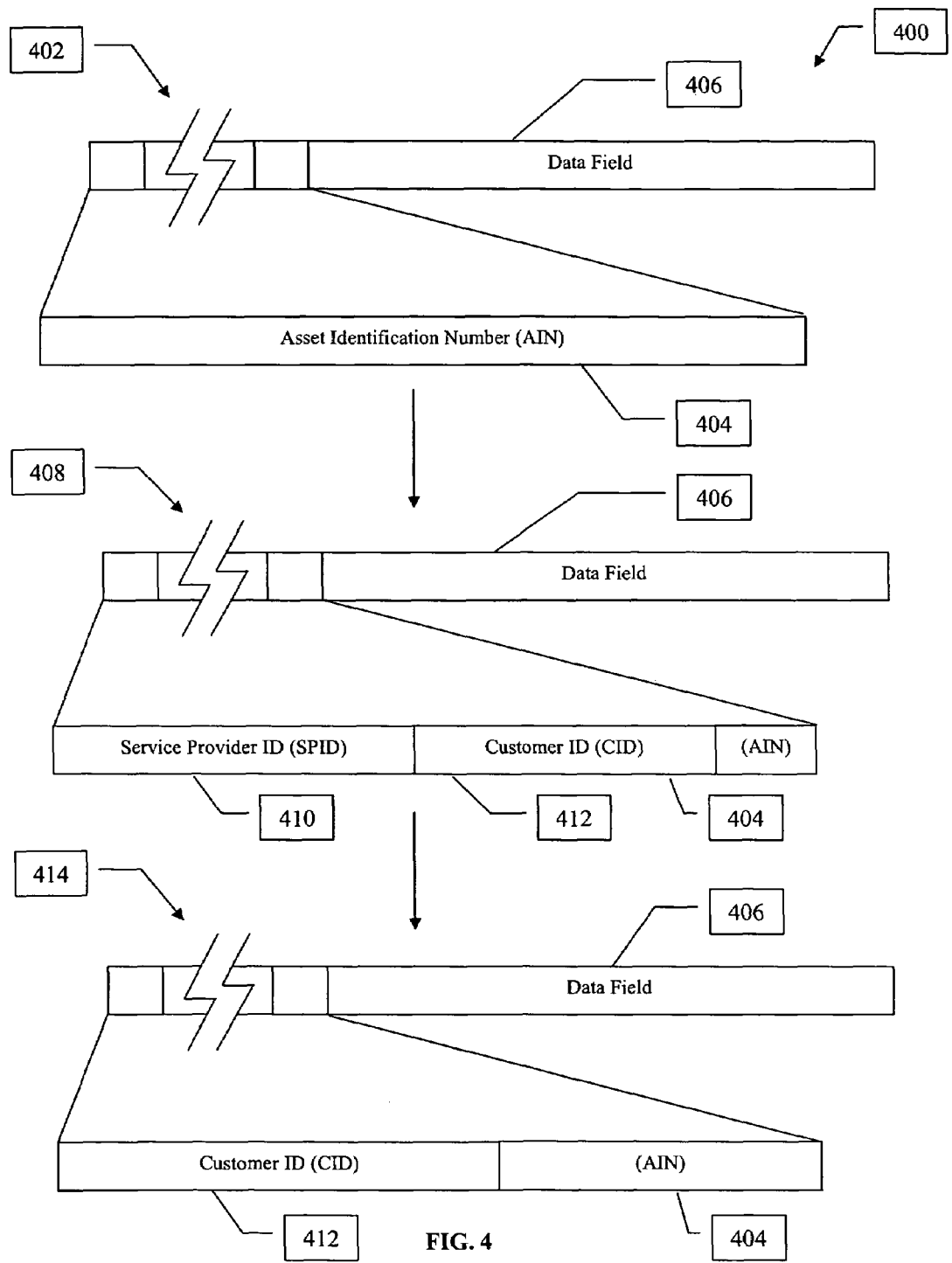
FIG. 4 shows embodiments of the location information message format in accordance with the present invention.

The present invention allows service providers to maintain current system configurations. For instance, a service provider 108 does not create the content placed into the signal but merely incorporates several content streams into a single transmission to the customer 124 or 126. As such, the present invention sends location information to the service provider 108 as a content stream. This content stream is formatted to be received by a specific customer 124 or 126. One embodiment of the different formats that the location information may take is shown in FIG. 4.

First, the location information message 400 is sent from the mobile device 205 to the location content provider 110 in a first format 402. In this format, the transmission may include an asset identification number 404 (AIN) and a data field 406. The asset identification number 404 is a mobile device identification specific code that identifies the transmission as belonging to the particular mobile device 205. This identification tag may be any number of bits or bytes. It is envisioned that with thousands of customer 124 or 126 each having several mobile devices 205 to track that the AIN 404 may be ten or more bits long. The parser 320 may receive this first format of the location information 400 and transfer it to the message switch 325.

The message switch 325 stores the AIN 404 in a database 335 or other storage means. To relay the information to the appropriate customer 124 or 126 the message switch 325 can associate the AIN 404 with a certain customer 124 or 126 of a certain service provider 108 and change the location information 400 into a second format 408. Thus, the message switch 325 can look up the AIN 404 and may attach a customer identification 412 (CID) and possibly, a Service Provider Identification 410 (SPID) to the location information 400. The CID 412 provides a tag that can be identified by the customer's set-top box 122 or computer 126. In essence the set-top box 122 or computer 126 looks at each message and discards all messages except those with the appropriate CID 412.

The SPID 410 functions as an ID tag for the service provider system. Depending on what type of communication link is used between the location content provider 110 and the service provider 108 or content provider 120, the SPID 410 may be in various formats or may not exist at all. For instance, if the location content 400 is sent to the service provider using an internet link, the SPID 410 may be any TCP/IP address or other address to get the information to the service provider 108. If a dedicated satellite link is used to get the information to the service provider 108, then no SPID 410 may be used as all the information sent is for that service provider 108.

At the service provider 108, the location information 400 may assume a third format 414. In this format, the SPID 410 may be stripped away as superfluous information. The location information 400 may be sent to the customer 124 or 126 using the CID 412 and the AIN 404. The CID 412 can be used by the customer's equipment to identify the message as belonging to that customer 124 or 126, and the AIN 404 will tell the customer's equipment to which asset the information belongs.

In the various embodiments shown in FIG. 4, the location information 400 contains a data field 406. Generally, the data field 406 includes the location data or the position of the mobile device 205 at a certain 404 time. The data may take many forms and be changed between one transmission to the next. In the first format 402, the data field 406 may only include a GPS coordinate position or some type of ephemeris representation of the location. As explained earlier, this positional information may come in many forms depending on the type of position finder used. Regardless, the data field 406 includes any information needed by the GIS System 330 to determine a position of the mobile device 205.

The data field may be modified in the second format 408. If the GIS System 330 and GIS Image Formatter 330 is incorporated into the location content provider 110, the data field 406 may include a single frame video image of a visual representation of the location of the mobile device 205. Thus, the data field 406 may be an MPEG or other formatted image used by the customer's equipment to display the GIS map and mobile device location. In other embodiments, the data field 406 may again only include location data that is not formatted for display.

When the data reaches the service provider 108, the service provider 108 may format the location data into an image for display. This situation occurs if the GIS Systems 330 are integrated into the service provider's system. Again, the data field 406 may only include location data at this point in the process.

Finally, at the customer's location, the set-top box 122 or computer system 126 may use the location data in the data field 406 to form a visual image for display on the display device 124 or 126. In other embodiments, the image received in the data field 406 may need no formatting and would be automatically displayed. With any of the above possibilities, the data field 406 may include the complete map with mobile device 205 location image. However, in one embodiment, the data field may include the mobile device 205 location and a number for a map that the customer 124 or 126 equipment may pull from storage and use to create the displayed image. Also, the location information 400 may be something other than a type of positional data, but the location information 400 may be a grid assignment on the X-Y axes of the television display. Thus, no image formatting is necessary, rather an icon is placed on the coordinates with the appropriate map background to create the displayed image. Other embodiments of data formats are contemplated and included in the present invention. One skilled in the art will recognize other methods of formatting and transmitting the location information 400.

Method for Providing Location Information to a Service Provider's Customers

Figure 5:
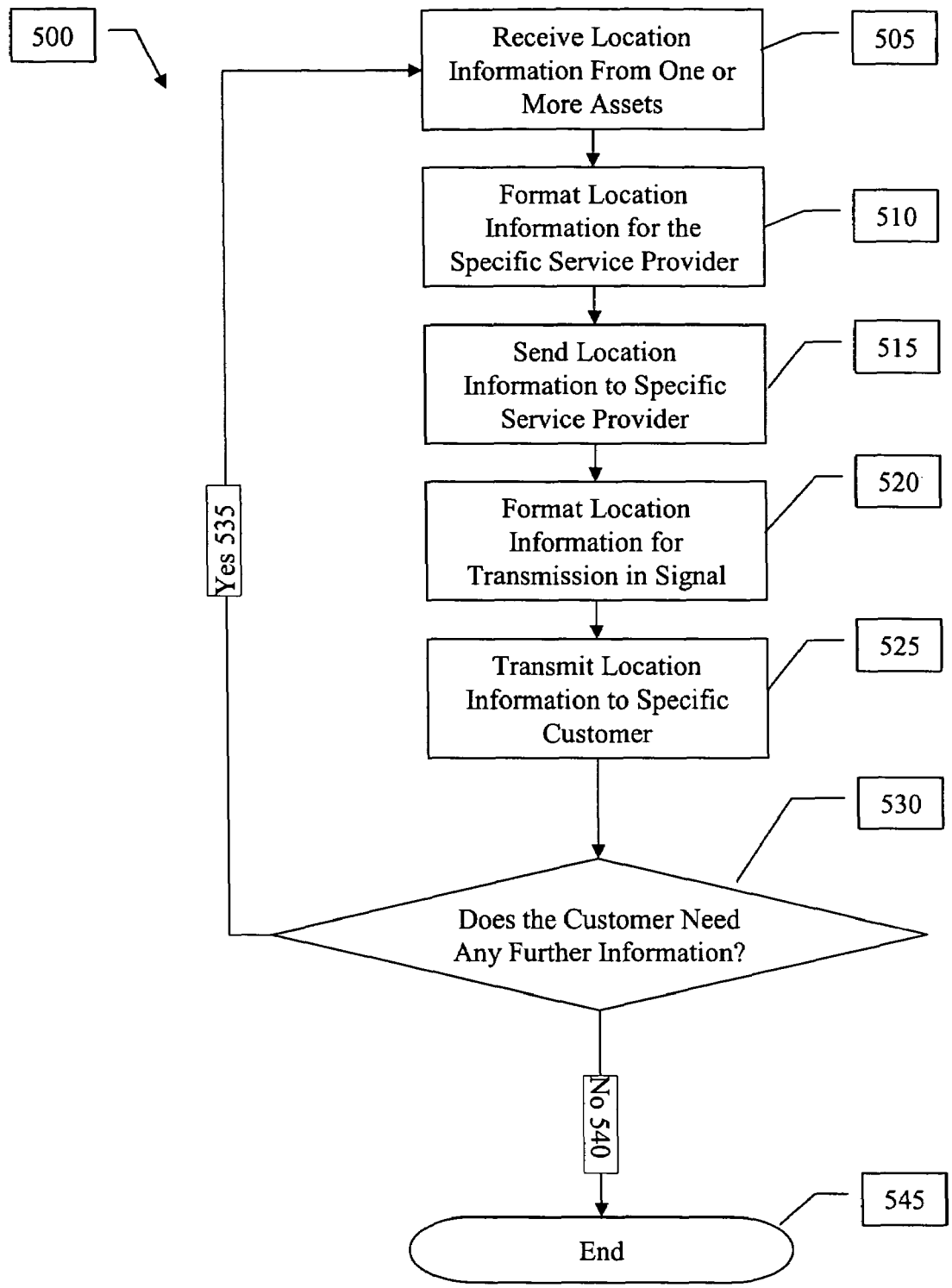
FIG. 5 shows an embodiment of a method of displaying a visual representation of information for a mobile device in accordance with the present invention.

Now turning to FIG. 5, it shows one embodiment of a method 500 for providing location information 400 to a customer 124 or 126 of the service provider 108. While this embodiment is only exemplary, many alterations to the method may be made. Some of those changes will be explained more below. However, one skilled in the art will recognize other embodiments of the method of providing the customer 124 or 126 with their location information 400. Those other embodiments are included in the present invention.

A mobile device or asset 205 acquires positional data from the position finder. In one embodiment, the GPS receiver 225 obtains ephemeris data as coordinates of a position of the asset at the specific time. This data is placed in a data field 406 of a message and a header is placed at the front of the message. The header includes the AIN 404 and any ID necessary to ensure delivery of the message to the location content provider 110.

The location content provider 110 receives 505 the message from the mobile device 205. While the location content provider 110 may receive several messages from numerous other mobile devices or assets 205, the method 500 will hereinafter be explained only in reference to the single message. One skilled in the art will recognize that the location content provider 110 may receive, format, and transmit numerous messages in very short time. The parser 320 receives the message from the mobile device 205 and decodes the message from the communication specific format, for instance a GPRS cellular phone message, into a format understood by the message switch 325.

The message switch 325 can determine by looking into its relational tables or database 335 for which customer 124 or 126 and service provider 108 the asset data 400 must be sent. The message switch 325 formats 510 the location information message 400 by attaching a header that includes the CID 412 and the SPID 410 to the message. This formatted message is sent to the specific parser 320 that communicates with the specific service provider 108. The parser 320 formats the location information 400 for transmission under a certain system and protocol. For instance, the parser 320 changes the message into a TCP/IP message to be routed on the internet and received at an internet node at the service provider's facility. The message is sent 515 to the service provider 108.

At the service provider's facility, the message is again 404 formatted for transmission as content to the customer 124 or 126. In one embodiment, a GIS System/Image Formatter 330 creates a visual map with the location information 400 represented as an icon on the map. The image is transformed 520 into a protocol specific data field 406 and multiplexed or integrated into the outgoing signal. For instance, the satellite television provider 114 may turn the image into an MPEG file and multiplex the signal into the outgoing satellite transmission. In another embodiment, the map is converted into a JPEG or other format compatible with use on a web server. The image is transferred to the customer 124 or 126 over the internet for display on their home computer 126. Regardless of the method or system of transmission, the service provider 108 may format 520 the message 400 to be received by the customer 124 or 126. This process may include any attachment of a header onto the message 400 that will be recognized by the customer 124 or 126 set-top box 122 or other receiving equipment. The location information 400 is transmitted 525 to the customer 124 or 126.

At the customer's location, the set-top box 122 or other equipment does any necessary formatting for display of the location information 400 on the display device 124 or 126. This formatting may include converting the image into an analog television signal or displaying the image in a high-definition digital television format. In another embodiment, a GIS System/Image Formatter 330 is resident on the set-top box 122, computer 126, or other device at the customer's location. The only data in the location information message 400 coming form the service provider would be the bare location data. This embodiment limits the size of the messages sent from the service provider 108. Essentially, the large MPEG or visual image files sent from a service provider 108 are much larger than the simple location data. For instance, and single MPEG file may be several thousand bytes while the location data may only be several bytes. In this way, the bandwidth used to transfer location content to the customer 124 or 126 from the service provider 108 may be limited. This change from the prior art allows easier inclusion of location content in existing service providers systems and allows the usage by thousands or millions of customers 124 and 126 of the service provider 108 without adversely affecting bandwidth capability.

The customer's equipment may create the display device image using the location data. An icon may be placed on a visual image of a map stored at the set-top box 122 or other equipment. In other embodiments, a simple address may be provided to the customer 124 or 126. A customer with two or more assets 102 being tracked would have several icons or displays on the screen. For instance, a family of four may have four icons for the four different members of the family. An added benefit of having a local GIS System 330 at the 400 customer's location is the ability of the customer 124 or 126 to customize the image or request 530 additional information without necessitating repeated transmissions of the image over the service provider's signal. For instance, if the customer 124 or 126 wished to zoom the image, the customer 124 or 126 may use a remote control button on the set-top box 122, or other control device to command the system to zoom. The GIS System 330 would obtain 404 a new map or zoom the current map with the icon placed in the new image. If the GIS System 330 were not local, a command would need to be forwarded 535 to the service provider or location content provider 110 and a new image created, formatted, and sent to the customer 124 or 126. Repeated commanding by the customer 124 or 126 would only create greater bandwidth usage by the location content. If no further information were required 540, the process can send new location information 400 periodically.

As the embodiment shows, a request from the customer 124 or 126 to the service provider for location information 400 is not necessary. While an embodiment is envisioned where the customer 124 or 126 sends a request to the service provider that asks for location information 400, the embodiment shown continuously sends location information 400 to the customers 124 and 126 that receive the service. Thus, the location data sent from the mobile devices 205 is sent periodically. For instance, the mobile device 205 may send updated location information 400 every five minutes. The formatting and transmitting from the location content provider 110 to the service provider 108 is then completed periodically also. In turn, the formatting and transmitting done by the service provider to the customer 124 or 126 is also periodic. These updates alleviate the customer 124 or 126 from having to request the location information 400. Rather, the customer 124 or 126 need only turn to the location content "channel" or website to see the location of all assets 102 related to that customer 124 or 126.

In some embodiments, a history of the location content may be stored. The storage may occur at the customer's set-top-box 122, at the service provider's facility, or at the location content provider's database 335. Upon request, the location content may be replayed to the customer's display device 124. Thus, the customer 124 or 126 may be able to review past data to see a location history of one or more assets 102. The amount of content data stored is immaterial, but in an exemplary embodiment, the location data for each asset 102 may be stored for one week. In other embodiments, both location information and messages may be communicated from the assets 102 to the customer 124 or 126 and vice versa. Thus, instead of calling an asset 102 on a separate device or on the communications transceiver, the customer 124 or 126 may input a message to the asset 102 and send it over the network 104. A message may be sent from the asset 102 to the customer 124 or 126 in similar fashion.

Some examples follow that will further elucidate the present invention.

EXAMPLE 1

John Smith purchases a DirecTV system and signs up for the DirecTV service that provides television programming provided by a satellite signal. As part of the content or programming offered by DirecTV, the satellite television provider 114 allows Mr. Smith to sign-up for a location content service. The service allows John to see the position of every cellular phone or special dog tag that John registers with the service.

John selects the service and provides the cellular phone identification information for his family's three cellular phones to the location content provider 110. The identification information is the number used to identify the cellular phone in the cellular system. Every cellular phone has an identification number that allows the cellular phone system to track the minutes called by the phone and identify that the phone belongs to a certain cellular service. Mr. Smith gives one phone to his wife Jane and the other to his son Billy. In addition, John purchases a special dog collar with a dog tag that can both receive GPS signals and transmit those signals over the cellular phone system. He puts the dog collar on the family's pet named Fido.

DirecTV sends Mr. Smith two set-top boxes 122 that are also PVRs. These systems include a hard drive, electronic components, and operating systems capable of operating a GIS System/Image Formatter 330 program. In this example, the set-top boxes have the regional maps of John's home state and the GIS System/Image Formatter 330 pre-installed. However, DirecTV can also download this information during periodic updates of software sent by satellite television providers 114 over their satellite transmission. These software updates normally occur at night and address specific set-top boxes 122.

After the set-top boxes 122 are installed at Mr. Smith's home, he can contact the satellite television service provider 114 to authorize his system to receive the satellite broadcast. DirecTV receives the identification numbers from John's two set-top boxes 122. These identification numbers specifically identify those set-top boxes 122 in the satellite television system. A customer number is given to John for his service. John's two set-top boxes 122 are authorized by downloading commands over the satellite transmission to the boxes with their identification numbers. The authorization programs the set-top boxes 122 to receive certain programming or content including the location information "channel". Channels usually describe an analog television tuning to a certain broadcasted frequency, but the term is used here to describe a certain signal of digital television that carries specific programming content—like HBO, CNN, ESPN, etc.

DirecTV provides the customer 124 or 126 number to the location content provider 110 and establishes a format for the signals that will go to John Smith. In this example, DirecTV will receive location data from the location content provider 110 with a header that includes the service provider's TCP/IP internet address, the CID 412, the AIN 404, and the data 406. The location content provider 110 begins receiving data from the mobile devices 205 listed for John Smith.

One day, John begins to worry that Billy has been lying to John about some of his extracurricular activities. Billy has been telling his dad that he has been studying at the library every night for three hours. Unbeknownst to young Billy, John has given Billy a new cellular phone device with a built-in GPS receiver 225. The new phone sends GPS coordinates to the location content provider 110 and are relayed to John's DirecTV system where John can see Billy's location throughout the day. One evening, when Billy is assumedly at the library, John turns to the location information channel on his television system.

Billy, who is at the local arcade, has his cellular phone in his pocket. The cellular phone receives a transmission from several GPS satellites (or triangulates from several cell towers). The signals are interpreted into a GPS coordinate location. This location is formed into a message with a data field 406 and a header. The header includes the AIN 404 and a TCP/IP address for the location content provider 110. Every five minutes the cellular phone sends an internet transmission to the location content provider 110 with the GPS coordinates. The location content provider 110 receives the transmission at the internet router 315 and sends the message to the parser 320. The parser 320 formats the transmission into an API message and sends it to the message switch 325. In a relational database 335 in the message switch 325, the AIN 404, which was provided by Mr. Smith, is correlated to Mr. Smith's customer number and his service provider, DirecTV. The message is reformatted to place the CID 412 and SPID 410 in the header. This new message with the location coordinates is sent to another parser 320. The new parser 320 formats the message into a TCP/IP transmission using the SPID 410 and sends the message to the internet router 315. At the router, the message is transmitted to DirecTV.

Once received at DirecTV's internet router, the message is multiplexed into a stream of numerous location content messages. In essence, Mr. Smith's message becomes one of many similar messages all in the location content bit stream. This stream is multiplexed into the satellite transmission and beamed to the satellite. At John's home, the location content stream is demultiplexed from the satellite transmission by his two set-top boxes 122. The set-top boxes 122 scan the headers of the several location content messages for John's CID 412, which were programmed into and stored by the set-top boxes 122 during the authorization process. Once John's CID 412 is found that message is demultiplexed from the bit stream, and the other messages are discarded.

The GIS System 330 on Mr. Smith's set-top box 122 then determines where the GPS coordinate is located using the GIS database 335 and files stored on the system. Once the location is determined, the GIS System 330 obtains a map from the database 335 and locates an icon, for instance a small boy for Billy, on the map. The GIS Image Formatter 330 creates an image file, such as an MPEG file of the map and the icon. This file is sent to the display device 124.

On the display device 124, John Smith can see that his son is at the arcade. Also, through a similar process, the dog, Fido, is shown as located at the veterinarian's office with his wife, Jane. Both the wife icon and the dog icon are shown at the same place. An address may be given for the different locations. For instance, the location for his wife and dog may read, "Peterinarian, 1800 Main St., Smalltown, Colo." Other information may be provided including, but not limited to, telephone numbers, directions to a location selected, advertising materials, the condition of the asset being looked at, or a direction or speed of travel for the asset. Also, John may decide to play back the location data from Billy from the past two weeks. The data may show Billy has been at the arcade several times when he told his father that he was studying. At this point, John can drive to the arcade to punish his son. Since he knows his location, he can proceed to the arcade directly without searching.

EXAMPLE 2

Another example may involve two business persons, George and Beth, from the same company but from different offices that wish to meet for lunch. Unfortunately, both George and Beth are unfamiliar with the city where they are supposed to meet. Beth suggests meeting at the corner of $14^{th}$ and Elm. George uses a GPS service offered by his ISP 112 before he leaves his home office. The service provider 108 112 downloads a map and directions to the George's computer 126 for this location. He uploads this information to his business mobile device 205 205, which includes a cellular telephone, a GPS receiver 225, and a personal digital assistant component. He can display the map on the mobile device 205 and show his current location on that map via the GPS coordinates derived from the GPS receiver 225.

At the time of the meeting, George arrives at the meeting location, $14^{th}$ and Elm. Unfortunately, Beth forgot to download a map or directions like George. However, she is part of the same company and is a customer of the location content provider 110. Thus, her location can be received from her mobile device 205 and routed to another computer 126 or mobile device 205 that uses the ISP 112.

Beth calls the George and tells him that she is lost. He tells her not to worry, and he calls the service provider 112. He instructs the service provider 112 to route her location information 400 to his mobile device 205. After looking up the CID 412 for George and Beth, the service provider 112 requests the location content provider 110 to format the location information messages for Beth to route to the cellular phone of George. At the message switch 325, the relational database 335 is modified to append the CID 412 of George to the location messages of Beth. The messages are routed to the ISP 112, who sends the information to George's mobile device 205 via an internet transfer. In a few moments, George can see the location of his colleague a few blocks away. Contacting her cellular phone, George gives a list of directions, watches her progress on his mobile device 205 as she approaches his location, and then meets her as she reaches 14th and Elm.

EXAMPLE 3

Sally and her family are taking a trip to Yellowstone. Hearing that the weather in Yellowstone can be unpredictable, she desires to know what driving conditions during her trip. Sally subscribes to a location and weather alert service through On Star. As part of the service, On Star can route weather information to a subscriber for the location of the customer's car at any moment in time.

To provide this service, Sally's car is equipped with a mobile device 205. The mobile device 205 includes a GPS receiver 225, a transmitter that uses a cellular service, a GIS System 330, and a display device 124 in the car. On Star is a content provider 120, which sends Sally information to her mobile device 205.

To obtain her position and current weather information, her mobile device 205 determines a GPS coordinate set for her position. This information is sent to the location content provider 110 over the cellular system 104. The location content provider 110 formats the information to include a data field 406 with the map required for the display and the GPS coordinates. A header is attached to the message that includes On Star as the addressee, and includes the CID 412 and AIN 404. On Star further formats the message to include current weather data for Sally's position and anticipated destination. These additions expand the data field 406 for the location message 400.

The location information message 400 is transmitted to Sally over an On Star cellular link to the car. The GIS System 330, on board Sally's car, retrieves the map specified by the location content provider 110, puts an icon on the map showing her position, and overlays the weather information (in visual form) provided over the map. The weather information may include, but is not limited to, pictures of weather fronts, satellite imagery, temperatures at locations around the asset's position, or predicted weather for the anticipated destination.

This example also demonstrates that other information may be sent to the mobile device 205 by the location content provider 110 or the content provider 120. That information may include, but is not limited to, road conditions, traffic conditions, satellite imagery, locations of businesses, advertisements, messages, routes, or positions of other assets 102.

EXAMPLE 4

This example demonstrates an idea called "geofencing." In essence, an asset 102 may be contained within a given area using a mobile device 205 and the location content system. One skilled in the art will recognize that this system may be useful in containing prisoners, parolees, mental patients, pets, or other entities requiring monitoring and control.

For this example, an elderly man named Fred has Alzheimer's Disease. He has begun to have more severe dementia. At times, Fred forgets who he is or where he is at, and he tends to wander off without the ability to return to his home. He lives in a hospice that provides a mobile device 205 that the occupants can where. The information from the mobile device 205 is sent to a location content provider 110, which can forward that information to a customer 124 or 126, such as a relative, that subscribes to a group of ISPs 112.

Henry is Fred's son and Henry subscribed to the service. Henry, from any computer, can access his ISP, which carries the location information provided by the location content provider 110. On his ISP, Henry inputs a user name and password to see the location of his father, Fred. To ensure Fred's safety, Henry, the hospice, and the location content provider 110 created a virtual fence around Fred's apartment in the hospice. If Fred wanders more than 500 feet from the grounds of the hospice, a warning message is sent to Henry and the hospice. The message shows Fred's current position and his direction of travel. In this way, Henry or the hospice personnel may respond and retrieve Fred before he cannot be found.

This system functions by first receiving a GPS signal from the GPS satellites. This signal is translated into a position. The position is sent to the location content provider 110. A GIS system at the location content provider 110 checks the position against location of the hospice grounds. If the location received is more than 500 feet away, the location content provider 110 creates a message and a location file. This information is forwarded to Henry's ISP. At the ISP, the information is used to update Henry's personal webpage that shows Fred's location. An instant message is created with the warning and sent to Henry's computer, his cellular phone, and his PDA 126. Once the instant message is received, Henry can access his webpage and see Fred's location. If Fred is not supposed to be out of the hospice, Henry can call the hospice to retrieve Fred. However, if Henry has taken Fred to a ball game and the message appears, Henry can send a reply to ignore the warnings for a period of time, and thus, he can discontinue the messages while Fred and Henry are at the ball game. Using this system, the hospice and Henry have created a "geofence" around Henry. The geofence keeps Henry contained within the hospice and minimizes the risk that Fred's dementia will cause him harm.

EXAMPLE 4

In this example, a geofence is created around a store using RFID tags placed on goods sold in the store. An RFID tag is a small electronic device that can be placed on items sold in a store. The device transmits a unique signal that can identify the item and that can be used to track the item around a network 104 of sensors.

If Susie entered Best Buy to shoplift the newest John Mayer CD, the location content system could prevent her from completing her dastardly plan. Susie could pick up the CD and place it in her purse. She could nonchalantly exit the store into a crowd of people waking to and from their cars. A warning message is created by the local RFID system that a CD left the store, but was not paid for at the checkout counter. The system may accomplish this task buy comparing the inventory records against the RFID listings for that CD tag. The RFID system can create a position estimate, every five seconds, and send the positions to the location content provider 110. The messages are translated into GIS locations at the location content provider 110. The messages are routed to a set of PDAs used by the store security that have a GPS, a small GIS system, and a communications transceiver.

Since no one saw Susie, the security personnel are unsure who has the CD. However, the RFID system was also installed in the parking lot. As Susie walks to her car to make her get away, the RFID tag continues to transmit the tracked signal. Several security personnel rush into the parking lot with their PDAs. The RFID tag's position is displayed on the PDA along with a position of the PDA, which uses the GPS signal to send position to the location content provider 110. As the personnel approach Susie's location, the two icons get closer together. Once the two icons are near or together, the personnel can easily identify who has the CD. Susie is apprehended just getting into her car. False imprisonment can be a sticky problem for stores trying to prevent shoplifting. This system just explained allows the security personnel reasonably to hold Susie because the RFID tag proves she has the CD in her purse. Thus, the system helps prevent shoplifting and helps mitigate problems proving shoplifting.

The above description and examples are included to illustrate the present invention. However, the present invention is not limited to these embodiments. One skilled in the art will recognize other embodiments that are included in this invention.

We claim:

1. A method for use in providing information regarding one or more mobile devices, comprising:
    establishing a location content provider for transferring location information regarding a mobile device from a location source to a target service provider;
    establishing a defined message format for receiving messages from said location source such that a received location message includes service provider information identifying a target service provider, location information for a mobile device and mobile device identification information;
    receiving, at said location content provider, a first location message in said defined message format regarding a first mobile device;

first processing said first location message to obtain first service information regarding a first target service provider of said first location message;

providing storage, accessible by said location content provider for storing relay instructions, specific to each of multiple service providers, for relaying location messages for use by the service providers in providing location content to requestors;

based on said first target service provider information obtained from said first location message, second operating said location content provider to access said storage to obtain a set of relay instructions specific to said first target service provider; and third operating said location content provider to transmit a second location message to said first target service provider in accordance with said set of relay instructions, said second location message including location information and identification information regarding said first mobile device.

2. A method according to claim 1, wherein said step of receiving comprises receiving said first location message via a wireless network.

3. A method according to claim 2, wherein the wireless network is a cellular network.

4. A method according to claim 1, wherein the first location message includes one of, a condition, an activity, or a human directed message.

5. A method according to claim 4, wherein the location message includes one of GPS coordinates, directions, a speed, a LORAN position, a RFID position, or a street address.

6. A method according to claim 5, wherein the GPS coordinates are provided by a GPS receiver communicatively coupled to the mobile device.

7. A method according to claim 4, wherein the mobile device is attached to a vehicle.

8. A method according to claim 7, wherein the condition is information about one of speed, direction, airbag deployed, engine on, tire pressure, or fuel level.

9. A method according to claim 4, wherein the mobile device is carried by a person.

10. A method according to claim 1, wherein the location content provider includes at least one parser and a message switch.

11. A method according to claim 10, wherein the message switch receives and processes signals from a plurality of mobile devices.

12. A method according to claim 1, wherein the mobile device is one of a cellular device or an RFID unit.

13. A method according to claim 1, further comprising multiplexing two or more items of information into a single data stream that is transmitted over a single channel of television data.

14. A method according to claim 1, further comprising addressing an information data packet to the requestor.

15. A method according to claim 1, further comprising storing data of said second location message in memory.

16. A method according to claim 15, wherein the stored data is played back to the requestor.

17. A communication system to display location information about an object carrying a mobile device, comprising:

a processor for transferring location information regarding a mobile device from a location source to a target service provider, said processor being operative for processing messages in a defined message format including service provider information identifying a target service provider, location information for a mobile device and mobile device identification information;

an input module, operatively associated with said processor, for receiving a first location message in said defined message format regarding a first mobile device;

storage, accessible by said processor, for storing relay instructions, specific to each of multiple service providers, for relaying location messages for use by the service providers and providing location content to requestors;

said processor being operative for processing said first location message to obtain first service provider information regarding a first target service provider of said first location message;

said processor further being operative for accessing such storage, based on said first target service provider information obtained from said first location message, to obtain a set of relay instructions specific to said first target service provider; and an output module for transmitting a second location message to said first target service provider in accordance with said set of relay instructions, said second location message including location information and identification information regarding said first mobile device.

18. A communication system according to claim 17, wherein the mobile device is a cellular device.

19. A communication system according to claim 17, wherein said input module receiver said first location message via a wireless network.

20. A communication system according to claim 17, wherein the wireless network is one of a cellular network or an RFID network.

21. A communication system according to claim 17, wherein the location information pertains to a position of mobile device.

22. A communication system according to claim 17, wherein the first location message includes one of GPS coordinates, directions, speed, LORAN position, an RFID position, or a street address.

23. A communication system according to claim 22, wherein the GPS coordinates are provided by a GPS receiver communicatively coupled to the mobile device.

24. A communication system according to claim 17, wherein the location information includes at least one telemetry measure pertaining to a condition of the object.

25. A communication system according to claim 17, wherein the location information is determined in relation to one of a vehicle, a person, a weather station, an ATM machine, a credit card reader, or a pet.

26. A communication system according to claim 17, wherein the location information includes information about one of speed direction, airbag deployed, engine on, tire pressure, fuel level.

27. A communication system according to claim 17, wherein the processor includes comprises:
 a. a plurality of parsers; and
 b. a message switch coupled in communication to the plurality of parsers.

28. A communication system according to claim 27, wherein the parser receives and sends information to the mobile device.

29. A communication system according to claim 27, wherein the message switch routes the information.

30. A communication system according to claim 17, wherein the service provider is one of a satellite television service, a cable television service, a telephone service, an ISP, or a content provider.

* * * * *

UNITED STATES PATENT AND TRADEMARK OFFICE
CERTIFICATE OF CORRECTION

PATENT NO. : 7,672,677 B2
APPLICATION NO. : 10/999089
DATED : March 2, 2010
INVENTOR(S) : Howard et al.

It is certified that error appears in the above-identified patent and that said Letters Patent is hereby corrected as shown below:

Column 1, line 57, delete "can not" and insert therefor --cannot--.
Column 9, line 9, delete "there" and insert therefor --their--.
Column 15, line 2, delete "form" and insert therefor --from--.
Column 18, line 21, delete the second occurrence of "205".
Column 20, line 11, delete "4" and insert therefor --5--.
Column 20, line 22, delete "waking" and insert therefor --walking--.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,672,677 B2 |
| APPLICATION NO. | : 10/999089 |
| DATED | : March 2, 2010 |
| INVENTOR(S) | : William Brant Howard and James David Main, II |

It is certified that error appears in the above-identified patent and that said Letters Patent is hereby corrected as shown below:

Title Pg. Item (73) Assignee:

Delete "CompassCom Software Corporation" as the assignee and insert therefor
--CompassHoldings, Inc.-- as the assignee Signed and Sealed this
Twelfth Day of June, 2012

David J. Kappos
*Director of the United States Patent and Trademark Office*